United States Patent
Harris et al.

(10) Patent No.: US 11,821,350 B2
(45) Date of Patent: Nov. 21, 2023

(54) MULTI-TIER EXHAUST BURNER CONTROL FOR SCR CATALYST PRE-HEATING

(71) Applicant: Tenneco Automotive Operating Company Inc., Lake Forest, IL (US)

(72) Inventors: Thomas M. Harris, Jackson, MI (US); James E. McCarthy, Jr., Kalamazoo, MI (US)

(73) Assignee: Tenneco Automotive Operating Company Inc., Northville, MI (US)

( * ) Notice: Subject to any disclaimer, the term of this patent is extended or adjusted under 35 U.S.C. 154(b) by 0 days.

(21) Appl. No.: 17/752,183

(22) Filed: May 24, 2022

(65) Prior Publication Data

US 2023/0010915 A1    Jan. 12, 2023

Related U.S. Application Data

(60) Provisional application No. 63/220,100, filed on Jul. 9, 2021.

(51) Int. Cl.
*F01N 3/20* (2006.01)
*F01N 3/32* (2006.01)

(52) U.S. Cl.
CPC .......... *F01N 3/2033* (2013.01); *F01N 3/208* (2013.01); *F01N 3/32* (2013.01); *F01N 3/2066* (2013.01);
(Continued)

(58) Field of Classification Search
CPC ...... F01N 3/208; F01N 3/2033; F01N 3/2066; F01N 3/021; F01N 3/32; F01N 2610/146;
(Continued)

(56) References Cited

U.S. PATENT DOCUMENTS 10,738,676 B2   8/2020   Parrish
10,753,291 B1   8/2020   Choung et al.
(Continued)

FOREIGN PATENT DOCUMENTS

CN   212563398 U   2/2021
DE   4132814 C2    2/1994
(Continued)

*Primary Examiner* — Phutthiwat Wongwian
*Assistant Examiner* — Diem T Tran
(74) *Attorney, Agent, or Firm* — Harness, Dickey & Pierce, P.L.C.

(57) ABSTRACT

An exhaust control system for a vehicle includes a temperature sensor positioned downstream of an exhaust burner and upstream of an SCR catalyst in an exhaust system. The temperature sensor is configured to generate a measurement signal indicative a temperature of exhaust flowing through the exhaust system at an outlet of a DPF positioned downstream of the exhaust burner. An exhaust control module is configured to turn the exhaust burner on to heat the exhaust, monitor the temperature of the exhaust based on the measurement signal, subsequent to turning the exhaust burner on, turn the exhaust burner off based on an upper threshold temperature of the exhaust, and, subsequent to turning the exhaust burner off, turn the exhaust burner on based on a lower threshold temperature of the exhaust. The lower threshold temperature is less than the upper threshold temperature.

17 Claims, 8 Drawing Sheets

(52) U.S. Cl.
CPC ...... *F01N 2240/14* (2013.01); *F01N 2250/02* (2013.01); *F01N 2430/00* (2013.01); *F01N 2570/14* (2013.01); *F01N 2610/02* (2013.01); *F01N 2610/146* (2013.01); *F01N 2900/1404* (2013.01)

(58) Field of Classification Search
CPC ......... F01N 2240/14; F01N 2900/1404; F01N 2430/00; F01N 2570/14; F01N 2250/02; F01N 2610/02; Y02A 50/20; Y02T 10/12; Y02T 10/40
See application file for complete search history.

(56) References Cited

U.S. PATENT DOCUMENTS

| | | | |
|---|---|---|---|
| 10,941,689 | B2 | 3/2021 | Paukner et al. |
| 11,022,016 | B2 | 6/2021 | Huang et al. |
| 2008/0264042 | A1* | 10/2008 | Khadiya ............... F01N 3/36 60/299 |
| 2013/0061576 | A1* | 3/2013 | Gonze ................ F01N 13/009 60/286 |
| 2020/0102874 | A1 | 4/2020 | Kurtz et al. |
| 2020/0173331 | A1 | 6/2020 | Bunkus et al. |
| 2020/0340380 | A1 | 10/2020 | Sato |

FOREIGN PATENT DOCUMENTS

| | | | |
|---|---|---|---|
| DE | 4437655 C2 | | 3/1998 |
| DE | 102010027811 A1 | | 10/2011 |
| DE | 102017113366 | * | 12/2018 |
| DE | 102018122843 | * | 3/2020 |
| DE | 102018126621 A1 | | 4/2020 |
| DE | 102019202560 A1 | | 8/2020 |
| DE | 102019115141 A1 | | 12/2020 |
| DE | 102018118091 B4 | | 12/2021 |
| EP | 1936274 B1 | | 10/2011 |
| GB | 2280128 | * | 1/1995 |
| JP | 2016109096 A | | 6/2016 |
| JP | 2019120203 A | | 7/2019 |
| KR | 101393031 B1 | | 5/2014 |
| WO | WO-2020108725 A1 | | 6/2020 |
| WO | WO-2020161215 A1 | | 8/2020 |

* cited by examiner

MULTI-TIER EXHAUST BURNER CONTROL FOR SCR CATALYST PRE-HEATING

CROSS-REFERENCE TO RELATED APPLICATIONS

This application claims the benefit of U.S. Provisional Application No. 63/220,100, filed on Jul. 9, 2021. The entire disclosure of the application referenced above is incorporated herein by reference.

FIELD

The present disclosure relates to exhaust control systems and methods and more particularly to systems and methods for controlling selective reduction catalyst (SCR) temperature and airflow into an exhaust system.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

Air is drawn into an engine through an intake manifold. The air mixes with fuel from one or more fuel injectors to form an air/fuel mixture. The air/fuel mixture is combusted within one or more cylinders of the engine. Combustion of the air/fuel mixture generates torque.

Exhaust resulting from the combustion of the air/fuel mixture is expelled from the cylinders to an exhaust system. The exhaust from an engine combusting diesel fuel with an excess of air may include particulate matter (PM) and gas. The exhaust gas includes nitrogen oxides ($NO_x$), such as nitrogen oxide (NO) and nitrogen dioxide ($NO_2$). An exhaust treatment system may be used to reduce the amount of $NO_x$ and PM in the exhaust.

The exhaust treatment system may include a diesel oxidation catalyst (DOC). The DOC removes hydrocarbons and/or carbon oxides from the exhaust. The exhaust treatment system may also include a diesel particulate filter (DPF), which removes particulate matter (PM) from the exhaust. The exhaust treatment system may also include a selective catalytic reduction (SCR) catalyst. A diesel exhaust fluid (DEF) injector injects a DEF (e.g., a urea-water solution) into the decomposition tube or reactor, located upstream of the SCR catalyst. When the DEF encounters hot exhaust in the decomposition tube, the water portion undergoes evaporation and the urea undergoes decomposition to form ammonia. The ammonia (NH3) provided by the DEF is adsorbed by the SCR catalyst. When ammonia is present on the surface of the SCR catalyst, and the catalyst is hot, $NO_x$ in the exhaust will react with the ammonia to form nitrogen (N2). In this way the amount of $NO_x$ emitted by the engine is reduced.

SUMMARY

An exhaust control system for a vehicle includes a temperature sensor positioned downstream of an exhaust burner and upstream of a selective catalytic reduction (SCR) catalyst in an exhaust system of the vehicle. The temperature sensor is configured to generate a measurement signal indicative a temperature of exhaust flowing through the exhaust system at an outlet of a diesel particulate filter (DPF) positioned downstream of the exhaust burner. An exhaust control module is configured to turn the exhaust burner on to heat the exhaust by combusting air and fuel in a combustion chamber of the exhaust burner, monitor the temperature of the exhaust based on the measurement signal, subsequent to turning the exhaust burner on, turn the exhaust burner off based on an upper threshold temperature of the exhaust, and, subsequent to turning the exhaust burner off, turn the exhaust burner on based on a lower threshold temperature of the exhaust. The lower threshold temperature is less than the upper threshold temperature.

In other features, the temperature sensor is positioned at an outlet of the DPF. The exhaust control module is configured to turn the exhaust burner on prior to engine startup. The exhaust control module is configured to maintain the exhaust at the lower threshold temperature. Subsequent to turning the exhaust burner on based on the lower threshold temperature, the exhaust control module is configured to turn the exhaust burner off based on the upper threshold temperature. The upper threshold temperature is greater than or equal to 300° C. The exhaust control module is configured to detect a cold start condition and turn the exhaust burner on prior to engine startup in response to detecting the cold start condition. The exhaust control module is configured to increase an engine idle speed upon turning the exhaust burner on.

In other features, the exhaust control module is configured to detect a cold start condition, operate the exhaust burner based on a first set of thresholds including the upper threshold temperature and the lower threshold temperature in response to detecting the cold start condition, and operate the exhaust burner based on a second set of thresholds including a second upper threshold temperature and a second lower threshold temperature in response to the cold start condition not being detected. The second upper threshold temperature is less than the upper threshold temperature and greater than the lower threshold temperature.

In other features, the exhaust control system further includes an air pump configured to pump air into the combustion chamber of the exhaust burner, a spark plug configured to ignite an air/fuel mixture within the combustion chamber of the exhaust burner, a fuel control module configured to, while an engine of the vehicle is off prior to engine startup, selectively actuate a fuel injector and begin fuel injection, a pump control module configured to, while the engine is off prior to the engine startup, selectively turn on the air pump, and a spark control module configured to, while the engine is off and prior to the engine startup, selectively apply power to the spark plug and begin providing spark.

In other features, the exhaust control system further includes a diesel emissions fluid (DEF) injector configured to inject a DEF into the exhaust system upstream of the SCR catalyst and a DEF control module configured to, while an engine of the vehicle is off prior to engine startup, selectively actuate the DEF injector and begin DEF injection. Turning the exhaust burner on to heat the exhaust, turning the exhaust burner off, and turning the exhaust burner on subsequent to turning the exhaust burner off occur prior to engine startup.

A method of operating an exhaust control system of a vehicle includes receiving a measurement signal from a temperature sensor positioned downstream of an exhaust burner and upstream of a selective catalytic reduction (SCR) catalyst in an exhaust system of the vehicle. The measurement signal is indicative a temperature of exhaust flowing through the exhaust system at an outlet of a diesel particulate filter (DPF) positioned downstream of the exhaust burner. The method further includes turning the exhaust burner on to heat the exhaust by combusting air and fuel in a combustion chamber of the exhaust burner, monitoring the temperature of the exhaust based on the measurement signal, subsequent to turning the exhaust burner on, turning the exhaust burner off based on an upper threshold temperature of the exhaust, and, subsequent to turning the exhaust burner off, turning the exhaust burner on based on a lower threshold temperature of the exhaust. The lower threshold temperature is less than the upper threshold temperature.

In other features, the temperature sensor is positioned at an outlet of the DPF. At least one of turning the exhaust burner on, turning the exhaust burner off, and turning the exhaust burner on subsequent to turning the exhaust burner off occur prior to engine startup. The method further includes, subsequent to turning the exhaust burner on based on the lower threshold temperature, turning the exhaust burner off based on the upper threshold temperature. The method further includes detecting a cold start condition and turning the exhaust burner on prior to engine startup in response to detecting the cold start condition. The method further includes increasing an engine idle speed upon turning the exhaust burner on.

In other features, the method further includes detecting a cold start condition, operating the exhaust burner based on a first set of thresholds including the upper threshold temperature and the lower threshold temperature in response to detecting the cold start condition, and operating the exhaust burner based on a second set of thresholds including a second upper threshold temperature and a second lower threshold temperature in response to the cold start condition not being detected. The second upper threshold temperature is less than the upper threshold temperature and greater than the lower threshold temperature.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
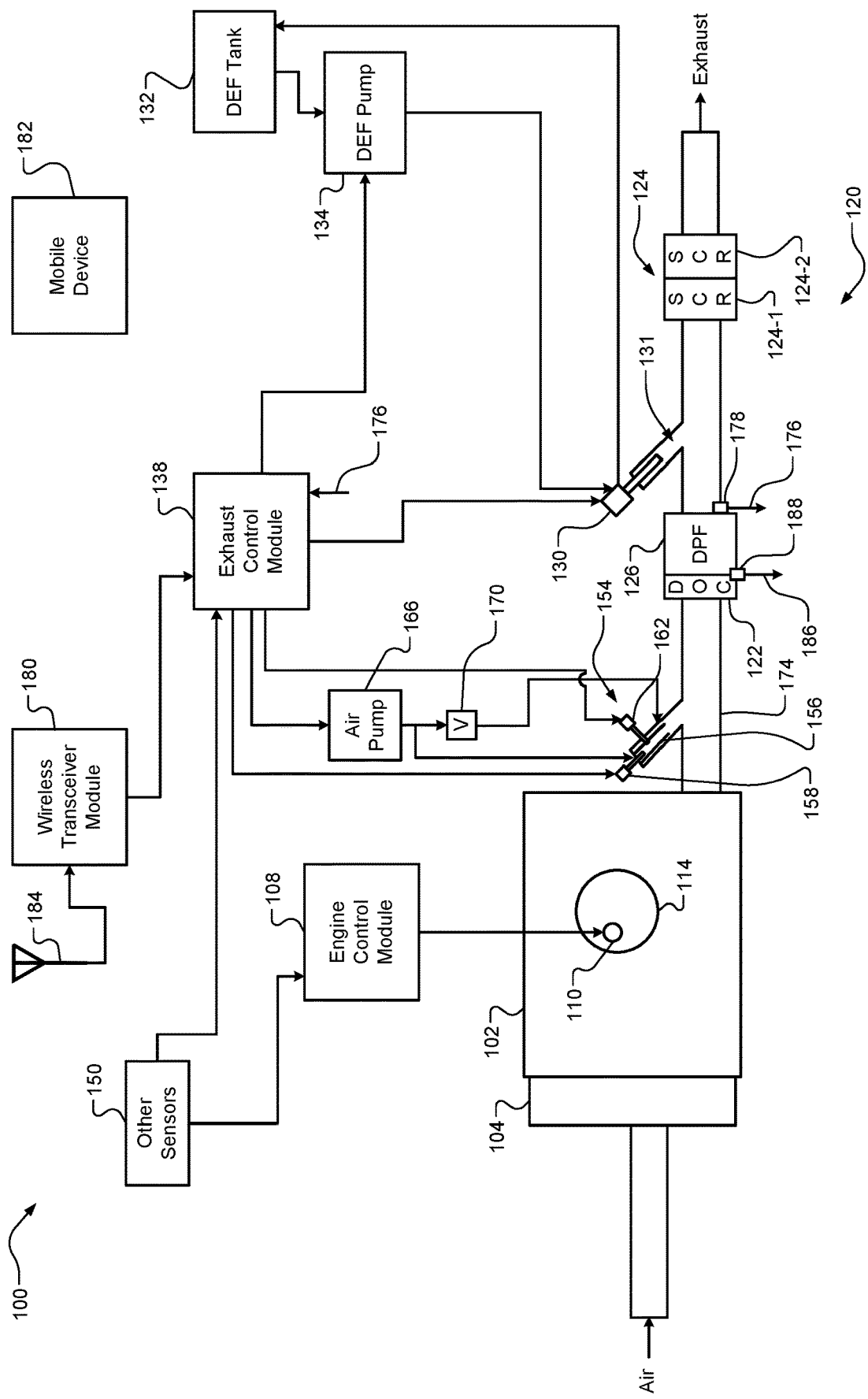
FIG. 1 is a functional block diagram of an example engine system.

A control module controls injection of a diesel exhaust fluid (DEF) into an exhaust system upstream of a selective catalytic reduction (SCR) catalyst. The SCR catalyst receives exhaust output by an engine of a vehicle. The exhaust includes nitrogen oxides ($NO_x$). The DEF includes urea and water. Heat from the exhaust decomposes urea from the DEF into ammonia ($NH3$). The SCR catalyst stores ammonia. Ammonia reacts with $NO_x$ in the exhaust thereby reducing the amount of $NO_x$ that is output from the SCR catalyst.

The engine may generate a high level of $NO_x$ at startup. The amount of ammonia stored on (by) the SCR at startup, however, may be low. The temperature of the exhaust at engine start up may be too low to enable DEF injected into a decomposition tube to be processed into ammonia. The $NO_x$ output of the vehicle may therefore be relatively high after engine startup.

The SCR catalyst may be warmed using an exhaust burner prior to and/or upon engine startup. The burner combusts air and fuel to warm the SCR catalyst. Combustion may be initiated by a spark plug or another type of ignition device. Warming the SCR catalyst may decrease $NO_x$ output of the vehicle after engine startup by preparing the SCR catalyst to store ammonia for reaction with $NO_x$ sooner than if warming is not performed. In some conditions, DEF injection may be started prior to engine startup to further decrease $NO_x$ output of the vehicle after engine startup.

Accordingly, in some conditions the exhaust burner may be used to pre-heat the SCR catalyst (i.e., prior to engine startup). Conversely, the exhaust burner may be used upon engine startup in cold start conditions (i.e., upon receiving an engine start signal in cold start conditions). In cold start conditions, it is desirable to heat up the SCR catalyst and other components of the exhaust treatment system as quickly as possible. As such, the exhaust burner may be controlled to heat the exhaust system to a relatively high temperature to ensure that the exhaust burner is not turned off before the SCR catalyst is adequately heated during cold start conditions.

Subsequent to a cold start, the engine may continue to operate under low load for some period of time, resulting in relatively cool exhaust and causing the SCR catalyst to operate at sub-optimal temperatures. Further, use of the exhaust burner to heat the exhaust will become necessary, but use of the exhaust burner consumes additional fuel, decreasing fuel economy and increasing carbon dioxide production. Multi-tier threshold exhaust burner control systems and methods according to the present disclosure are configured to regulate the exhaust burner to minimize fuel consumption and maintain SCR catalyst temperatures for optimizing $NO_x$ conversion during low-load operation. Although described with respect to exhaust burners, the principles of the present application may also be implemented using other types of exhaust heaters, including, but not limited to, high-powered electrical heaters.

Referring now to FIG. 1, a functional block diagram of an example engine system 100 is presented. An engine 102 generates propulsion torque for a vehicle. The vehicle may have a class 4 rating, a class 5 rating, a class 6 rating, a class 7 rating, or a class 8 rating, such as from the United States Department of Transportation (DOT). Class ratings of vehicles are based on gross vehicle weight rating (GVWR). Generally speaking, GVWR increases as class rating increases and vice versa. While the engine 102 is shown and will be discussed as a diesel engine, the engine 102 may be another suitable type of engine. One or more electric motors (or motor-generators) may additionally generate propulsion torque.

Air is drawn into the engine 102 through an intake manifold 104. One or more fuel injectors, such as fuel injector 110, inject fuel that mixes air to form an air/fuel mixture. The air/fuel mixture is combusted within cylinders of the engine 102, such as cylinder 114. The fuel injector 110 inject fuel directly into the cylinder 114. Heat from compression within the cylinder 114 may initiate combustion within the cylinder 114. The ECM 108 controls fuel injection by the fuel injector 110. Although the engine 102 is depicted as including one cylinder, the engine 102 may include more than one cylinder. One fuel injector may be provided per cylinder.

Exhaust is expelled from the engine 102 to an exhaust system 120. The exhaust may include particulate matter (PM) and exhaust. The exhaust (gas) includes nitrogen oxides ($NO_x$), such as nitrogen oxide (NO) and nitrogen dioxide (NO2). The exhaust system 120 includes a treatment system that reduces the respective amounts of $NO_x$ and PM in the exhaust.

The exhaust system 120 includes a diesel oxidation catalyst (DOC) 122, a diesel particulate filter 126, and one or more selective catalytic reduction (SCR) catalysts, such as SCR catalyst 124-1 and SCR catalyst 124-2 (collectively "SCR catalyst 124"). The SCR catalyst 124-1 may, for example, include an iron zeolite or another suitable type of SCR catalyst. The SCR catalyst 124-2 may include a copper zeolite or another suitable type of SCR catalyst. In various implementations, the SCR catalysts 124-1 and 124-2 may be implemented within the same housing.

The exhaust flows from the engine 102 to the DOC 122. Exhaust output from the DOC 122 flows to the DPF 126. The DPF 126 filters particulate from the exhaust. In various implementations, the DPF 126 and the DOC 122 may be implemented within the same housing. While the example of the DPF 126 being disposed downstream of the DOC 122 is shown, the DPF 126 may alternatively be disposed upstream of the DOC 122. The exhaust flows from the DPF 126 to the SCR catalyst 124.

A diesel exhaust fluid (DEF) injector 130 injects a DEF into the exhaust system 120 upstream of the SCR catalyst 124. For example, the DEF injector 130 may inject the DEF into a decomposition tube 131 where water in injected DEF evaporates and urea is decomposed and hydrolyzed into NH3. The decomposition tube 131 may also be referred to as a reactor. For example only, the decomposition tube 131 may be located between the DOC 122 and the SCR catalyst 124. The DEF includes urea (e.g., CO(NH2)2) and water. The DEF is stored in a DEF tank 132 before injection. A DEF pump 134 draws DEF from the DEF tank 132 and pumps the DEF to the DEF injector 130.

An exhaust control module 138 controls actuation (e.g., opening and closing) of the DEF injector 130 and therefore controls injection of DEF into the exhaust system 120. The exhaust control module 138 may also control operation of the DEF pump 134, such as to maintain a predetermined pressure of DEF input to the DEF injector 130, as described in FIG. 2 in more detail.

When the engine is running, normal burner and DEF control may be used. When the engine is running, urea from DEF injected by the DEF injector 130 reacts with the hot exhaust to produce ammonia, and ammonia is supplied to the SCR catalyst 124. Heat evaporates the water in the DEF, and ammonia (NH3) is supplied to the SCR catalyst 124.

The SCR catalyst 124 stores (i.e., adsorbs) ammonia supplied by the DEF. The SCR catalyst 124 catalyzes a reaction between stored ammonia and $NO_x$ passing the SCR catalyst 124.

The amount of ammonia stored by the SCR catalyst 124 may be referred to as current storage. The current storage may be expressed as a mass of ammonia (e.g., grams), a number of moles of ammonia, or another suitable measure of the amount of ammonia stored by the SCR catalyst 124.

A percentage of $NO_x$ input to the SCR catalyst 124 that is removed from exhaust via reaction with ammonia may be referred to as $NO_x$ conversion efficiency. The $NO_x$ conversion efficiency is a function of the current storage of the SCR catalyst 124. For example only, the $NO_x$ conversion efficiency may increase as the current storage of the SCR catalyst 124 increases and vice versa.

The current storage of the SCR catalyst 124, however, is limited to a maximum amount of ammonia. This maximum amount of ammonia is referred to as a maximum storage capacity of the SCR catalyst 124. Maintaining the current storage of the SCR catalyst 124 near the maximum storage capacity ensures that a maximum possible amount of $NO_x$ is removed from the exhaust. In other words, maintaining the current storage near the maximum storage capacity may ensure that a greatest possible $NO_x$ conversion efficiency is achieved.

However, an inverse relationship exists between the maximum storage capacity and a temperature of the SCR catalyst 124. More specifically, the maximum storage capacity decreases as the SCR temperature increases during engine operation and vice versa.

The reaction of ammonia with $NO_x$ produces nitrogen and water. Other components of the exhaust, such as oxygen (O2), may also be involved in the ammonia and $NO_x$ reaction.

One or more sensors may be implemented in the exhaust system 120, such as one or more $NO_x$ sensors, one or more temperature sensors, one or more oxygen sensors, and/or one or more other types of sensors. For example, a temperature sensor may measure a temperature of the SCR catalyst 124. In various implementations, the temperature of the SCR catalyst 124 may be estimated based on one or more exhaust temperatures. Other example types of sensors include a mass air flowrate (MAF) sensor, a recirculated exhaust flow rate (EFR) sensor, an intake air temperature (IAT) sensor, a coolant temperature sensor, a manifold absolute pressure (MAP) sensor, an engine speed (RPM) sensor, an exhaust pressure sensor, and/or one or more other suitable sensors. Sensors are collectively illustrated by 150 in FIG. 1.

A burner 154 may also be connected to the exhaust system 120, such as upstream of the DOC 122 and the DPF 126. The burner 154 may include a fuel injector 158, a spark plug 162, and an air pump 166. While the example of the burner 154 including a spark plug is provided, the present application is also applicable to other types of igniters and ignition devices.

When on, the air pump 166 pumps air into a combustion chamber (within a flame sheath 156) and to the exhaust system 120. The fuel injector 158 injects fuel (e.g., diesel fuel) into the combustion chamber. The fuel mixes with the air from the air pump 166. The spark plug 162 generates spark within the combustion chamber. The spark ignites the air and fuel from the fuel injector 158 and the air pump 166. The flame sheath 156 is configured to shield a flame within the combustion chamber from being blown out, such as by exhaust from the engine 102 while the engine 102 is running.

The combustion of the air and fuel generates hot gas, which can be used to heat one or more components of the exhaust system 120 and/or for one or more other reasons.

The exhaust control module 138 controls fuel injection by the fuel injector 158, spark generation by the spark plug 162, and operation of the air pump 166. In various implementations, the exhaust control module 138 may control a speed of the air pump 166 regardless of whether the burner 154 is receiving fuel for combustion. When receiving fuel, the exhaust control module 138 may control the speed of the air pump 166 to achieve the desired air-to-fuel ratio. If the burner 154 is operated while the engine is running, the exhaust control module 138 may operate the burner 154 over a full range of air-to-fuel ratios that enable stable combustion.

Figure 4:
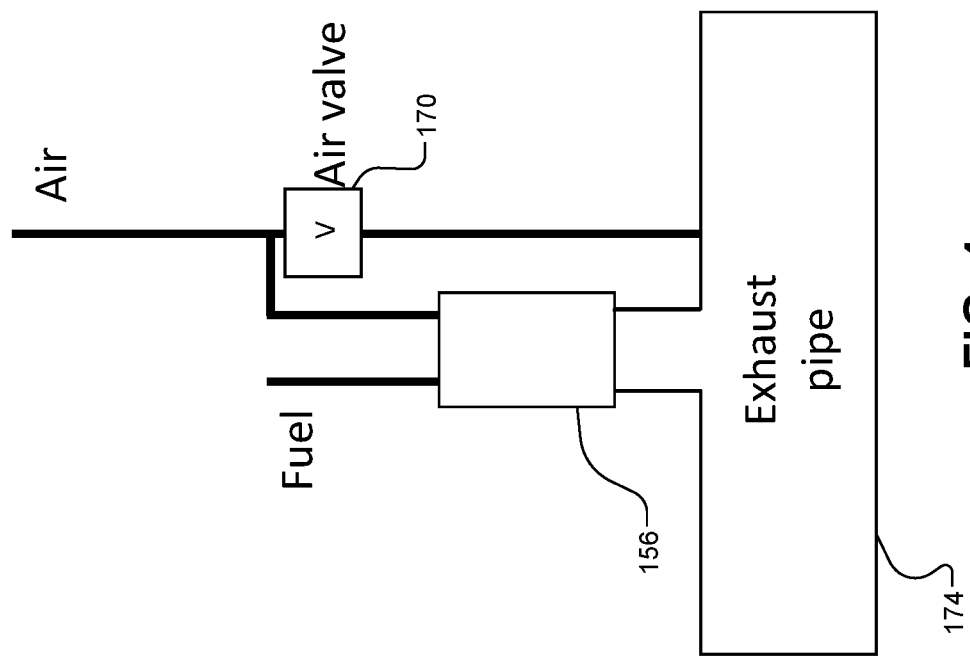
FIGS. 3 and 4 are functional block diagrams of example air valve connections.
Figure 3:
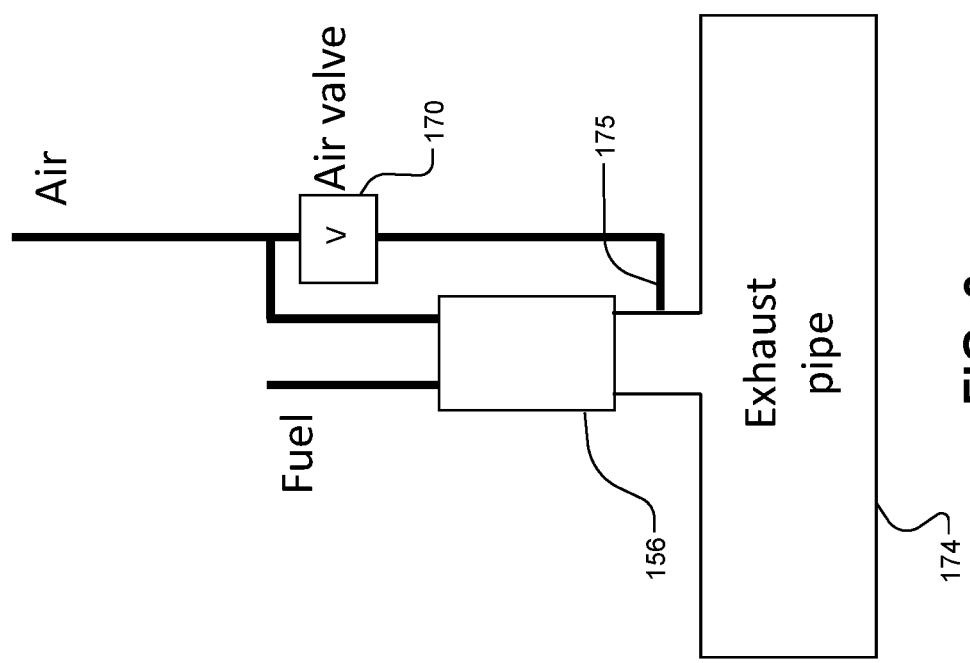

The air pump 166 also pumps air to an air valve (V) 170. The air valve 170 regulates airflow to a second location, such as around the flame sheath 156. Flowing air around the flame sheath 156 may cool the flame sheath 156 and increase a lifetime of the flame sheath 156. In various implementations, the second location may be between the flame sheath 156 and an exhaust pipe 174 that is connected to the burner 154, such as illustrated at 175 in FIG. 3. Alternatively, the air valve 170 may output air from the air pump 166 directly to the exhaust pipe 174, such as illustrated in FIG. 4. The exhaust control module 138 also controls actuation of the air valve 170.

An engine control module (ECM) 108 controls a torque output of the engine 102 while the engine 102 is running. The ECM 108 also controls starting and shutdown of the engine 102. The ECM 108 may start the engine 102, for example, in response to user actuation of one or more user input devices, such as an ignition button or switch of the vehicle and/or a combination of one or more user input devices of a key fob. The ECM 108 may shut down the engine 102, for example, in response to user actuation of the one or more user input devices (e.g., the ignition button or switch) of the vehicle and/or the one or more user input devices of the key fob.

As discussed above, the exhaust control module 138 may control injection of the DEF by the DEF injector 130. For example only, the exhaust control module 138 may control the timing and rate of DEF injection. By controlling DEF injection, the exhaust control module 138 controls the supply of ammonia to the SCR catalyst 124 and the current storage of the SCR catalyst 124.

The rate at which DEF is injected may be referred to as a DEF injection rate (e.g., grams per second). A rate at which ammonia is supplied to the SCR catalyst 124 may be referred to as an ammonia supply rate (e.g., grams per second). The exhaust control module 138 may determine a target supply rate for supplying ammonia to the SCR catalyst 124, determine a target DEF injection rate to achieve the target supply rate, and control the injection of DEF at the target DEF injection rate.

The vehicle may include a wireless transceiver module 180 configured to communicate wirelessly with mobile devices (e.g., key fobs, cellular phones, etc.), such as mobile device 182, using a communication protocol. The communication protocol may be a Bluetooth (BT) (defined by a section of IEEE 802.15) communication protocol, a WiFi (defined by a section of IEEE 802.11) communication protocol, or another suitable communication protocol. The wireless transceiver module 180 communicates wirelessly via one or more antennas, such as antenna 184.

The $NO_x$ emissions of the vehicle may be relatively high in response to engine startup. In some examples, the SCR catalyst 124 may be warmed while the engine 102 is off before an engine startup, such as when a mobile device that communicates with the wireless transceiver module 180 transitions from being more than a predetermined distance from the vehicle to being less than the predetermined distance from the vehicle. Another indicator of an engine startup may be, for example, unlocking of one or more door locks of the vehicle. In various implementations, the wireless transceiver module 180 may unlock one, more than one, or all of the door locks of the vehicle in response to receipt of user input to the mobile device.

The wireless transceiver module 180 may determine the distance between a mobile device and the vehicle, for example, using triangulation and multiple antennas of the vehicle. For example, the wireless transceiver module 180 may determine the distance of the mobile device to one antenna based on a relative signal strength indicator (RSSI) of signals between the mobile device and that antenna. RSSI may increase as distance decreases and vice versa. While the example of RSSI is provided, another suitable signal strength indicator may be used. The wireless transceiver module 180 may determine the distance between the mobile device and the vehicle based on the locations of antennas and the distances between the mobile device and the antennas, such as using an equation or a lookup table.

Warming before engine startup is performed by operating the burner 154 before the engine startup. The exhaust control module 138 may control the burner 154 (fueling via the fuel injector 158 and/or air from the air pump 166), such as using a fuel lean air/fuel mixture for warming. During the warming, the air valve 170 may be closed such that no air flows through the air valve 170 to the second location. While the engine 102 is running after startup, the exhaust control module 138 may partially or completely open the air valve 170 such that air flows from the air pump 166 to the second location.

If the temperature of the SCR catalyst 124 becomes greater than a predetermined temperature during the warming before engine startup, the exhaust control module 138 may begin DEF injection. The predetermined temperature may correspond to a temperature above which DEF may decompose into ammonia. Warming the SCR catalyst 124 may enable a decrease in $NO_x$ emissions of the vehicle after engine startup as DEF injection may begin sooner after the engine startup. DEF injection before engine startup may further decrease $NO_x$ emissions of the vehicle after engine startup.

At the beginning of a cold start, the burner 154 may be operated according to relatively high threshold (e.g., 300° C. or greater) to heat up the SCR catalyst 124 as quickly as possible. In this manner, the burner 154 will not be turned off before the SCR catalyst 124 is adequately heated during cold start conditions. However, subsequent to a cold start, the engine 102 may continue to operate under low load for some period of time, resulting in relatively cool exhaust and causing the SCR catalyst 124 to operate at sub-optimal temperatures. Further, use of the burner 154 to heat the exhaust consumes additional fuel, decreasing fuel economy and increasing carbon dioxide production. The exhaust control module 138 according to the present application is configured to implement multi-tier threshold control of the burner 154. For example, the exhaust control module 138 is configured to control the burner 154 (i.e., selectively turn the burner on and off) in response to a measurement signal 176 indicative of a temperature downstream of the DPF 126, such as a temperature of the exhaust measured using a sensor 178 positioned at an outlet of the DPF 126.

In one example, the exhaust control module 138 may control the burner 154 based on a single temperature threshold (i.e., the exhaust control module 138 implements single-tier threshold control). For example, the burner 154 is turned on until the signal 176 indicates that the temperature downstream of the DPF 126 reaches a predetermined threshold (e.g., 200° C.) and then the exhaust control module 138 turns the burner 154 off. In this example, the threshold is selected to balance $NO_x$ conversion, fuel consumption and $CO_2$ production. If a higher threshold is selected, $NO_x$ conversion is increased while fuel production and $CO_2$ production are also increased. Conversely, if a lower threshold is selected, $NO_x$ conversion is decreased while fuel production and $CO_2$ production are also decreased. In other words, as the threshold decreases and the burner 154 is turned off sooner, an average temperature of the DOC 122 and the DPF 126 decreases (corresponding to a lower temperature of the SCR catalyst 124). Accordingly, while lowering the threshold conserves fuel and lowers $CO_2$ emissions, $NO_x$ conversion of the SCR catalyst 124 is less effective.

In another example, the exhaust control module 138 of the present application is configured to control the burner 154 based on multiple (e.g., two or more) temperature thresholds to implement multi-tier threshold control. In this example, the exhaust control module 138 initially (e.g., prior and/or subsequent to a cold start) controls the burner 154 until an upper threshold (e.g., 300° C. or greater, such as 400° C.) is reached and then turns the burner 154 off. The exhaust control module 138 continues to monitor the decreasing measured temperature subsequent to the burner 154 being turned off until the temperature reaches or decreases below a lower threshold (200° C.) and then again turns the burner 154 on.

The exhaust control module 138 continues to maintain the burner 154 according to the lower threshold during operation of the engine 102. For example, the exhaust control module 138 turns the burner 154 on when the measured temperature reaches or decreases below the lower threshold. In this manner, operation of the burner 154 is maintained during extended low-load operation of the engine 102.

The upper threshold for multi-tier threshold control (e.g., 300° C.) may be selected to be greater than the threshold used for single-tier threshold control (200° C.). Accordingly, the burner 154 may be operated for a longer initial duration. However, since exhaust flow rate prior to and during cold starts is relatively low, heat generated by the burner 154 may not be effectively forced downstream of the burner 154 and into the SCR catalyst 124, which may contribute to overheating of the burner 154 and less effective cold start $NO_x$ conversion. Accordingly, in some examples, the exhaust control module 138 may be further configured to increase an idle speed of the engine 102 while the burner 154 is on during cold start operation. Increasing the idle speed of the engine 102 increases exhaust flow to move heat generated by the burner 154 downstream, thereby preventing overheating of the burner 154 and optimizing $NO_x$ conversion.

In another example, the exhaust control module 138 is configured to implement hysteresis control to operate the burner 154 between upper and lower thresholds. For example, instead of turning the burner 154 on until the upper threshold is reached and subsequently maintaining the burner 154 at the lower threshold, the exhaust control module 138 may operate the burner 154 between the lower threshold and the upper threshold. In this example, the exhaust control module 138 initially operates the burner 154 until the upper threshold (e.g., 300° C.) is reached and then turns the burner 154 off. When the measured temperature decreases to the lower threshold (e.g., 200° C.), the exhaust control module 138 again turns the burner 154 on. In this manner, since a greater average exhaust temperature is maintained (e.g., a temperature between the lower and upper thresholds, such as 240-260° C.) relative to simply maintaining the temperature at the lower threshold, more heat is stored in the DOC 122 and the DPF 126 and $NO_x$ conversion is increased.

In the above examples, subsequent to a cold start and when the engine 102 is not operating under sustained low-load conditions, the exhaust may reach a temperature sufficient to prevent the burner 154 from being turned on. For example, the measured temperature of the exhausted indicated by the signal 176 may reach and exceed the lower threshold during normal operation of the engine 102 even when the burner 154 is off. In this manner, the burner 154 is only operated when necessary to maintain the SCR catalyst 124 at adequate temperatures to meet desired $NO_x$ conversion levels.

In another example, the exhaust control module 138 is configured to operate the burner 154 according to more than two thresholds, two or more different sets of upper and lower thresholds, etc. For example, during cold start conditions, the exhaust control module 138 may turn on the burner 154 until an upper threshold (e.g., 300° C.) is reached and then operate the burner between a lower threshold (e.g., 200° C.) and an intermediate threshold (e.g., 250° C.). The exhaust control module 138 may also operate the burner 154 according to a first set of thresholds (e.g., 200 and 300° C.) when cold start conditions are detected (e.g., engine coolant being below a predetermined threshold, such as 35° C.) and according to a second set of thresholds (e.g., 200 and 250° C.) or a single threshold (e.g., to maintain the measured temperature at or around a single temperature, such as 200° C.) when cold start conditions are not detected. For example, cold start conditions may not be detected when coolant temperature and/or other factors indicate that the engine 102 has been operated recently, corresponding to a warm or hot start.

The exhaust control module 138 may selectively switch between different sets of thresholds based on various detected conditions. For example, during sustained low-load operation (e.g., loads insufficient to maintain a desired temperature without the burner 154 being turned on), the measured temperature may decrease below the lower threshold, causing the exhaust control module 138 to turn the burner 154 on until the upper threshold of 300° C. is reached. Consequently, the exhaust temperature may cycle through multiple, relatively large temperature differences (i.e., between 200 and 300° C.). If exhaust temperatures consistent with the lower threshold are sufficient to maintain desired $NO_x$ conversion levels, then the additional fuel consumption and $CO_2$ production associated with repeatedly turning the burner 154 on to reach the upper threshold are unnecessary.

Accordingly, the exhaust control module 138 may switch to a different set of thresholds during sustained low-load operation (e.g., low-load operation that continues for longer than a predetermined period, such as five minutes, in response to the burner 154 being turned on a predetermined number of times within a predetermined period, etc.). For example, for the second set of thresholds, the lower threshold may be decreased (e.g., to 225° C. and 180° C., respectively), and/or the upper threshold may be decreased (e.g., to 225° C., to 250° C., etc.). Reducing the lower threshold decreases a frequency of activation of the burner 154. As a result, a frequency of the on and off cycling of the burner 154 is decreased and an on duration of the burner 154 is decreased.

Although as shown the sensor 178 is positioned at an outlet of the DPF 126, in other examples the sensor 178 may be positioned at other locations (e.g., at an inlet of the DOC 122, between the DOC 122 and the DPF 126, etc.). For example, the DOC 122 and the DPF 126 function as thermal reservoirs. Accordingly, the temperature measured at the sensor 178 at the outlet of the DPF 126 corresponds to a combined heat capacity of the DOC 122 and the DPF 126. Conversely, if the sensor 178 is positioned at an outlet of the DOC 122 (i.e., between the DOC 122 and the DPF 126), the measured temperature will correspond to a ratio of a length of the DOC 122 to a combined length of the DOC 122 and the DPF 126. For example, a temperature measured at the outlet of the DOC 122 may correspond to ⅓ of the combined heat capacity of the DOC 122 and the DPF 126. Accordingly, positioning the sensor 178 at the outlet of the DOC 122 may result in the burner 154 being turned on and off more frequently while reducing an amplitude of thermal waves passing through the exhaust system 120.

Further, values selected for the upper and lower thresholds may vary based on the positioning of the sensor 178. For example, if positioned at the outlet of the DOC 122 (instead of at the outlet of the DPF 126 as shown in FIG. 1), the upper threshold may be increased to achieve desired heat delivery to components downstream of the DOC 122. Conversely, the lower threshold may be increased to reduce on/off cycling frequency of the burner 154.

Figure 2:
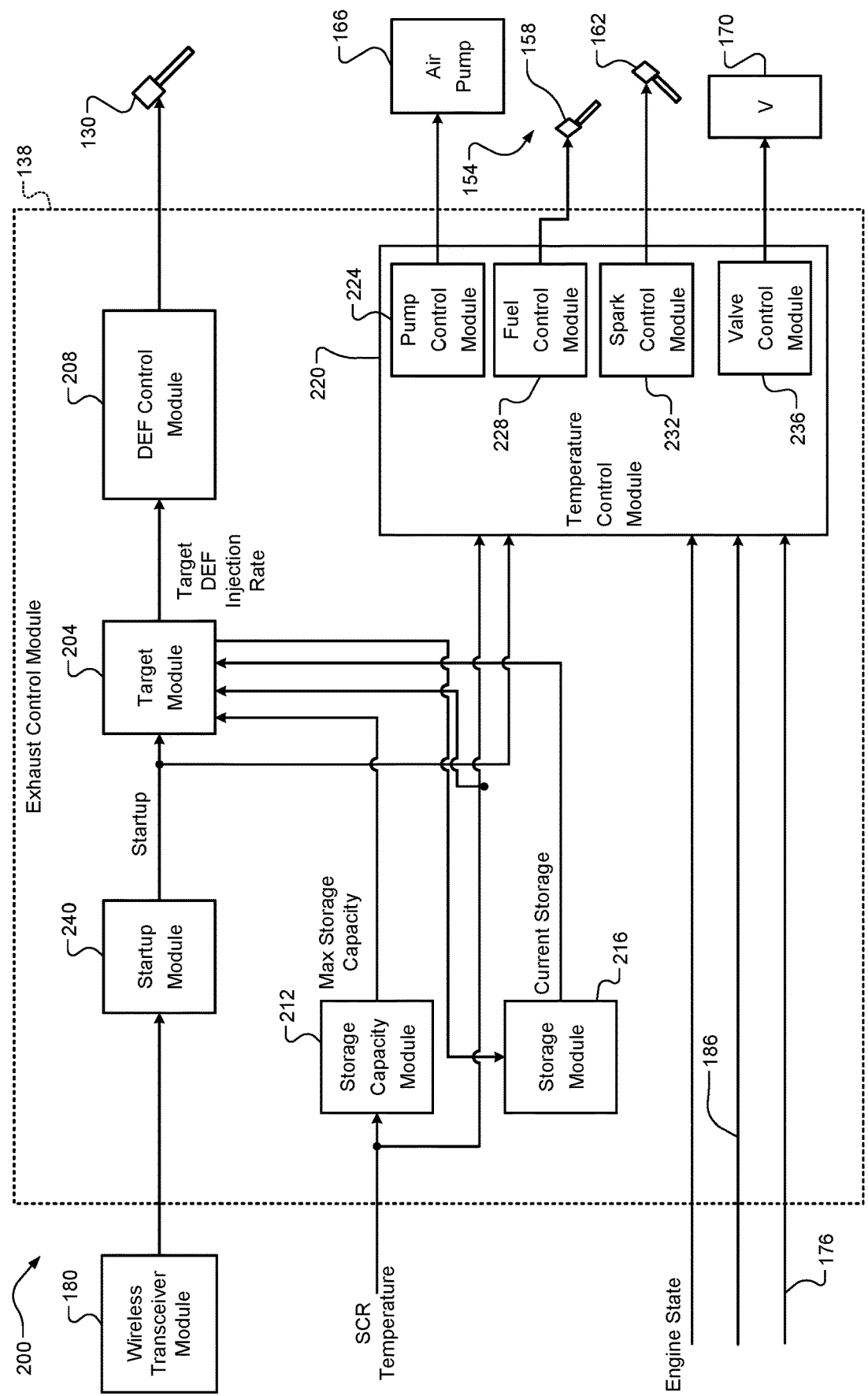
FIG. 2 is a functional block diagram of an example exhaust control system.

FIG. 2 is a functional block diagram of an example exhaust control system 200 including the exhaust control module 138 and the burner 154. A target module 204 determines a target DEF dosing rate, for example, based on a target (ammonia) supply rate to the SCR catalyst 124. The target module 204 may determine the target DEF injection rate using one of a lookup table and an equation that relates target supply rates to target DEF injection rates. The target DEF injection rate corresponds to an injection rate of the DEF to achieve the target supply rate of ammonia to the SCR catalyst 124. The target supply rate corresponds to a target rate to supply ammonia to the SCR catalyst 124.

A DEF control module 208 controls opening and closing of the DEF injector 130 to control injection and to achieve the target DEF injection rate. The DEF control module 208 may open the DEF injector 130 by applying power (e.g., from a battery) to the DEF injector 130. The DEF control module 208 may close the DEF injector 130 by disconnecting the DEF injector 130 from power. The DEF control module 208 may control the DEF injector 130 using pulse width modulation (PWM) control or another suitable type of control.

The target module 204 may determine the target supply rate, for example, based on a target current storage for the SCR catalyst 124, a current storage of the SCR catalyst 124, and/or one or more other parameters. The target module 204 may determine the target supply rate, for example, using one of an equation and a lookup table that relates target current storage, current storage and/or other parameters to target supply rates.

While the engine is running, the target module 204 may determine the target current storage, for example, based on a predetermined percentage of a present maximum storage capacity of the SCR catalyst 124. The predetermined percentage may be, for example, 90 percent, 95 percent, or another suitable value less than or equal to 100 percent and greater than or equal to 50 percent. A predetermined percentage of 100 percent may increase a likelihood of ammonia slip, for example, in response to an increase in temperature, which causes a decrease in the maximum storage capacity and may cause ammonia to desorb from the SCR catalyst 124.

A storage capacity module 212 may determine the present maximum storage capacity based on a present temperature of the SCR catalyst 124. For example, the storage capacity module 212 may increase the present maximum storage capacity as the temperature decreases and vice versa. The storage capacity module 212 may determine the present maximum storage capacity using one of a lookup table and an equation that relates temperatures of the SCR catalyst 124 to maximum storage capacities.

When the engine 102 is off before an engine startup, the target module 204 may set the target storage to a percentage of a maximum storage capacity of the SCR catalyst 124 at a specified temperature. For example, the target module 204 may set the target current storage to 100 percent of the maximum storage capacity of the SCR catalyst 124 at 150 degrees Celsius. While these examples are provided, other percentages, temperatures, and target current storages values may be used. Copper-zeolite SCR catalysts may have storage levels approximately 3 grams/Liter of substrate volume.

A storage module 216 may determine the present (ammonia) storage of the SCR catalyst 124. While the engine 102 is off in response to an engine shutdown, the engine 102 is not outputting $NO_x$. However, the present storage of the SCR catalyst 124 at engine shutdown will be known as the storage module 216 tracks the current storage while the engine 102 is on. The present storage increases while DEF injection is performed while the engine 102 is off.

The storage module 216 may receive a present ammonia supply rate (e.g., grams per second). For example, the storage module 216 may receive the target supply rate from the target module 204. The storage module 216 may (mathematically) integrate the ammonia supply rate each predetermined period to determine masses of ammonia supplied to the SCR catalyst 124. The storage module 216 may add each mass of ammonia to the (then) current storage to update the current storage over time as DEF injection is performed.

A temperature control module 220 controls operation of the air pump 166, the air valve 170, the fuel injector 158, and the spark plug 162. More specifically, a pump control module 224 controls operation of the air pump 166, and a fuel control module 228 controls operation of the fuel injector 158. A spark control module 232 controls the spark plug 162, and a valve control module 236 controls actuation of the air valve 170.

The temperature control module 220 according to the present application is configured to control the burner 154 (e.g., the fuel control module 228, the spark control module 232, the fuel injector 158, the spark plug 162, etc.) further based on the signal 176 indicative of a measured temperature of the exhaust. For example, the temperature control module 220 is configured to selectively turn the burner 154 on and off based on the signal 176 and upper and lower temperature thresholds, different sets of upper and lower temperature thresholds, etc. as described above in more detail.

In some examples, the different sets of temperature thresholds may be based on measurements received from sensors in different positions. For example, the burner 154 may be controlled in accordance with a first set of temperature thresholds and the signal 176 received from the sensor 178 during cold start conditions. In this manner, the burner 154 may be controlled in accordance with the temperature of a structure (i.e., the DPF 126) having a relatively large heat capacity and associated lag during cold start conditions to ensure that a desired high temperature is reached. Conversely, the burner 154 may be controlled in accordance with a second (e.g., lower) set of temperature thresholds and a signal 186 received from a sensor 188 (e.g., positioned at an outlet of the DOC 122) subsequent to a cold start. In this manner, the burner 154 is controlled in accordance with the temperature of a structure (i.e., the DOC 122) having a smaller heat capacity subsequent to the cold start.

The ECM 108 controls engine startup as described above. Before the ECM 108 starts the engine 102, a startup module 240 may selectively generate a startup signal indicative of an upcoming engine startup. For example, the startup module 240 may generate the startup signal when the mobile device is within the predetermined distance (e.g., 20 feet) of the vehicle. The wireless transceiver module 180 may determine the distance between the mobile device and the vehicle, such as discussed above. Additionally or alternatively, the startup module 240 may generate the startup signal in response one or more doors of the vehicle being unlocked. Additionally or alternatively, the startup module 240 may generate the startup signal based on a present time, such as when the present time reaches a predetermined time when engine startup commonly (e.g., daily, such as on weekdays) occurs.

When the startup signal is generated, the pump control module 224 turns on the air pump 166. Additionally, the fuel control module 228 begins fuel injection via the fuel injector 158, and the spark control module 232 begins providing spark to ignite the air and fuel. Additionally, the valve control module 236 opens the air valve 170 to a predetermined open position such that some air from the air pump 166 flows to the second location, such as around the flame sheath 156. The predetermined open position may be partially or completely open. To provide a predetermined fuel lean air/fuel mixture relative to a stoichiometric air/fuel mixture when the startup signal is generated, at least one of (a) the fuel control module 228 may control (e.g., decrease) fueling and (b) the valve control module 236 may open the air valve 170. Providing a fuel lean air/fuel mixture may, for example, maximize warming of the SCR catalyst 124 before the engine startup.

An engine state signal indicates whether the engine 102 is running (on), starting (startup), or shut down (off). The ECM 108 may set the engine state signal and output the engine state signal to other modules.

Before the engine startup (when the startup signal is generated but before the engine startup has been initiated by the ECM 108), the DEF control module 208 may begin DEF injection when the temperature of the SCR catalyst 124 is greater than the predetermined temperature. As described above, injected DEF can decompose into ammonia for storage by the SCR catalyst 124 when the temperature is greater than the predetermined temperature. For example, the target module 204 may set the target supply rate as described above to adjust the current storage of the SCR catalyst 124 toward or to the maximum storage capacity or the predetermined percentage of the maximum storage capacity before the engine startup.

When the engine state indicates that the engine 102 is running, such as after the engine startup, the valve control module 236 may close the air valve 170 to a fully closed position such that all of the air output from the air pump 166 flows to within the flame sheath 156. Normal control of the burner 154 and DEF injection may be performed.

Regarding setting the target DEF injection rate, the target module 204 may first determine an amount of NH3 to be input to reach the target current storage based on a difference between the present storage and the target current storage.

The target module 204 may then, based on the amount of NH3 to be input, determine an amount of DEF to inject into the decomposition tube 131 to provide the amount of NH3. The target module 204 may set the target injection rate (e.g., over time) based on various factors, such as the SCR temperature or the temperature of the air exiting the DOC and DPF after the air pump 166 is on. For example, DEF injection may be disabled if the SCR temperature is too high or the temperature of the gas exiting the DPF 126 is too low. The SCR temperature may be determined, for example, based on an average of exhaust temperatures into and out of the SCR catalyst 124. The exhaust temperature sensors operate based on flowing gas, so the air pump 166 may be operated and DEF injection may be disabled for a period while the exhaust temperature sensors become ready.

When the temperature of the SCR catalyst 124 is less than the predetermined temperature, the target module 204 may determine an enthalpy rate of the (hot) air coming from the DPF 126 and entering the decomposition tube 131. The enthalpy rate may need to be greater by a factor of X than an enthalpy consumption rate corresponding to a maximum DEF dosing rate allowed. Processing of DEF within the decomposition tube 131 is endothermic, as each step in the process is endothermic, such as raising the temperature of the water from 25 degrees C. to 100 degrees C., evaporating the water, sublimating solid urea into gaseous urea, and decomposing urea into NH3 and HNCO, etc. Therefore, a DEF dosing rate may have an associated DEF enthalpy consumption rate.

The difference between the enthalpy rate of the hot air flow created by the air pump and the factor X may define a maximum enthalpy consumption rate and thus the corresponding maximum DEF dosing rate. The target module 204 may then set the target DEF injection rate to cause dosing at the maximum enthalpy consumption rate.

The factor (value) X may be calibrated based on one or more characteristics of the decomposition tube 131. When the DEF is injected into the decomposition tube 131, the droplets may impinge on surfaces. These surfaces are heated by the hot gas flow and cooled by the impinging droplets. If a wall film forms on the surface of the decomposition tube 131, the temperature will decrease, for example, due to the evaporation of the water in the DEF droplets. The target module 204 may limit the target DEF injection rate so that the enthalpy rate of the air is sufficient to keep the surface of the decomposition tube 131 hot and to prevent wall film formation.

If the present storage reaches the target storage before engine startup, DEF injection and the air pump 166 may be disabled. If the burner 154 has been operating (providing heat), it too is disabled.

Figure 5:
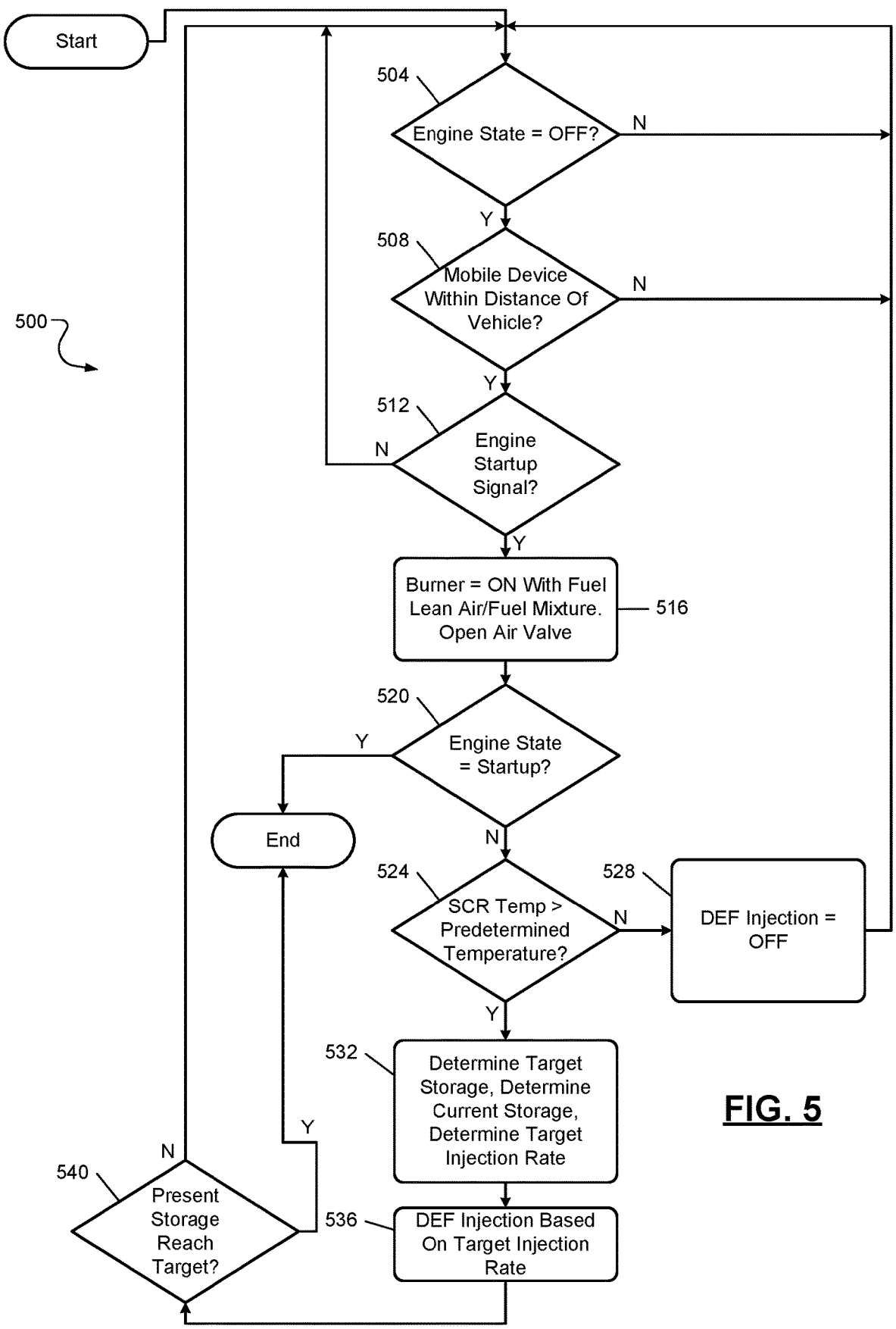
FIG. 5 is a flowchart depicting an example method of controlling DEF injection, heating, and airflow before engine startup.

FIG. 5 is a flowchart depicting an example method 500 of controlling DEF injection, heating, and airflow before an engine startup. Control begins with 504 where the target module 204 and the temperature control module 220 determine whether the engine 102 is off, such as whether the engine state signal indicates that the engine 102 is off. If 504 is true, control continues with 508. If 504 is false, control may remain at 504.

At 508, the wireless transceiver module 180 determines whether a mobile device associated with the vehicle is within the predetermined distance of the vehicle. If 508 is true, the startup module 240 generates the engine startup signal and control continues with 512. If 508 is false, control may return to 504. Additionally or alternatively to the mobile device being within the predetermined distance of the vehicle, the present application is also applicable to other predictors of engine startup, such as unlocking of door locks of the vehicle, a present time being within a predetermined period of a time when the vehicle is usually started, etc.

At 512, the temperature control module 220 determines whether the engine startup signal is being generated. If 512 is true, control continues with 516. If 512 is false, control returns to 504. At 516, the temperature control module 220 turns or maintains the burner 154 on. More specifically, the pump control module 224 turns or maintains on the air pump 166. The fuel control module 228 turns or maintains on fueling via the fuel injector 158. The spark control module 232 turns or maintains on spark from the spark plug 162. The valve control module 236 also opens the valve 170 to flow air to the second location at 516. To provide fuel lean air/fuel mixture to the burner 154, at least one of the fuel control module 228 and the valve control module 236 adjusts fueling and/or air valve opening, respectively.

At 520, the temperature control module 220 and the target module 204 determine whether the engine state is set to the engine startup state. The ECM 108 is starting (cranking) the engine 102 when the engine state is set to the engine startup state. If 520 is true, control may end. If 520 is false, control may continue with 524.

At 524, the target module 204 may determine whether the temperature of the SCR catalyst 124 is greater than the predetermined temperature. If 524 is true, control may continue with 532. If 524 is false, the target module 204 may set the target DEF injection rate to zero and DEF injection may be disabled at 528, and control may return to 504.

At 532, the target module 204 determines the target storage (e.g., sets the target storage to a predetermined storage for engine startup), and the storage module 216 updates the current storage of the SCR catalyst 124. The storage module 216 may update the current storage by integrating the (present) target supply rate to determine a mass of ammonia supplied to the SCR catalyst and adding the determined mass to the current storage. The target module 204 determines the target supply rate and the target DEF injection rate, as discussed above. At 536, the DEF control module 208 controls the DEF injector 130 to inject DEF based on or at the target DEF injection rate.

At 540, the temperature control module 220 and the target module 204 determine whether current storage has reached (e.g., is greater than or equal to) the target storage. If 540 is true, DEF injection and the burner 154 may be disabled, and control may end. IF 540 is false, control may return to 504.

Figure 6:
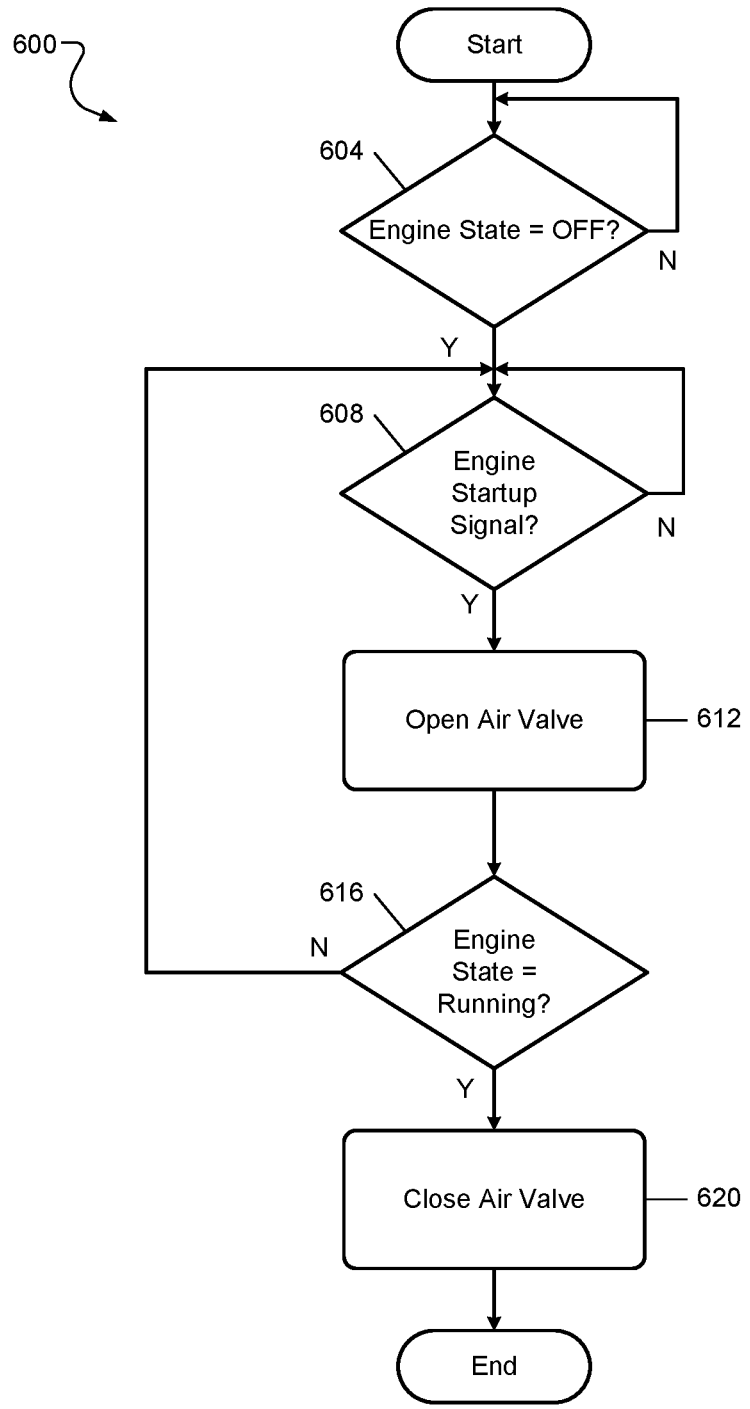
FIG. 6 is a flowchart depicting an example method of controlling an air valve.

FIG. 6 is a flowchart depicting an example method 600 of controlling the air valve 170. Control begins with 604 where the valve control module 236 determines whether the engine state is set to off and the engine 102 is shut down. If 604 is true, the valve control module 236 may close or maintain the air valve 170 closed, and control may continue with 608. In various implementations, the air valve 170 may be a normally closed valve and be biased closed. If 604 is false, control may remain at 604.

At 608, the valve control module 236 determines whether the engine startup signal has been generated. If 608 is true, control continues with 612. If 608 is false, control may remain at 608. At 612, the valve control module 236 opens the air valve 170 to the predetermined opening (e.g., partially or completely open) such that air can flow from the air valve 170 to the second location. At 616, the valve control module 236 determines whether the engine state is set to running. If 616 is false, control may return to 608. If 616 is true, control may continue with 620.

The valve control module 236 closes the air valve 170 at 620. The valve control module 236 may maintain the air valve 170 closed until the next engine startup. In various implementations, the valve control module 236 may open the air valve 170 while the engine is running when one or more conditions are satisfied.

Figure 7A:
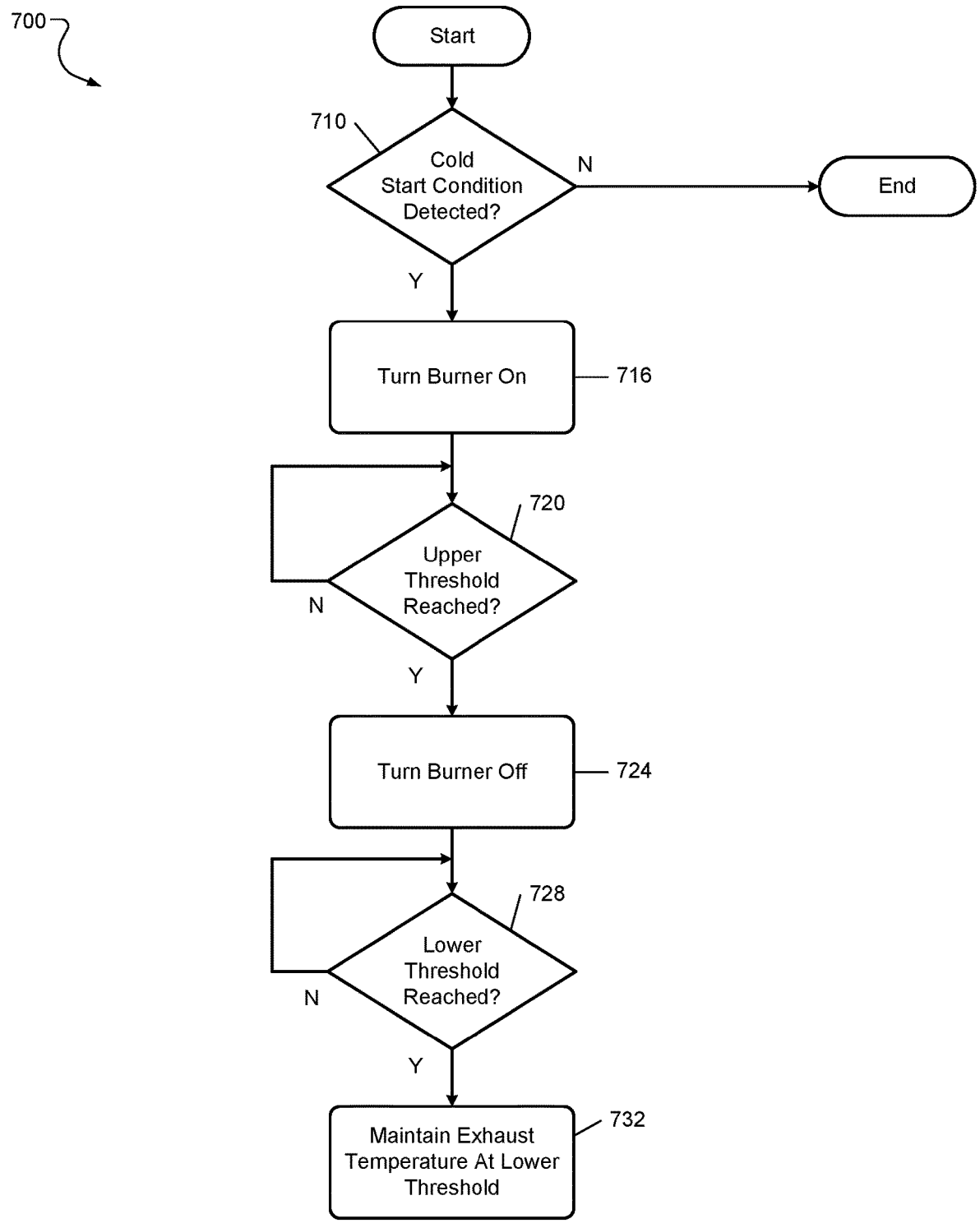
FIGS. 7A, 7B, and 7C are flowcharts depicting example multi-tier threshold control methods for an exhaust burner.
Figure 7B:
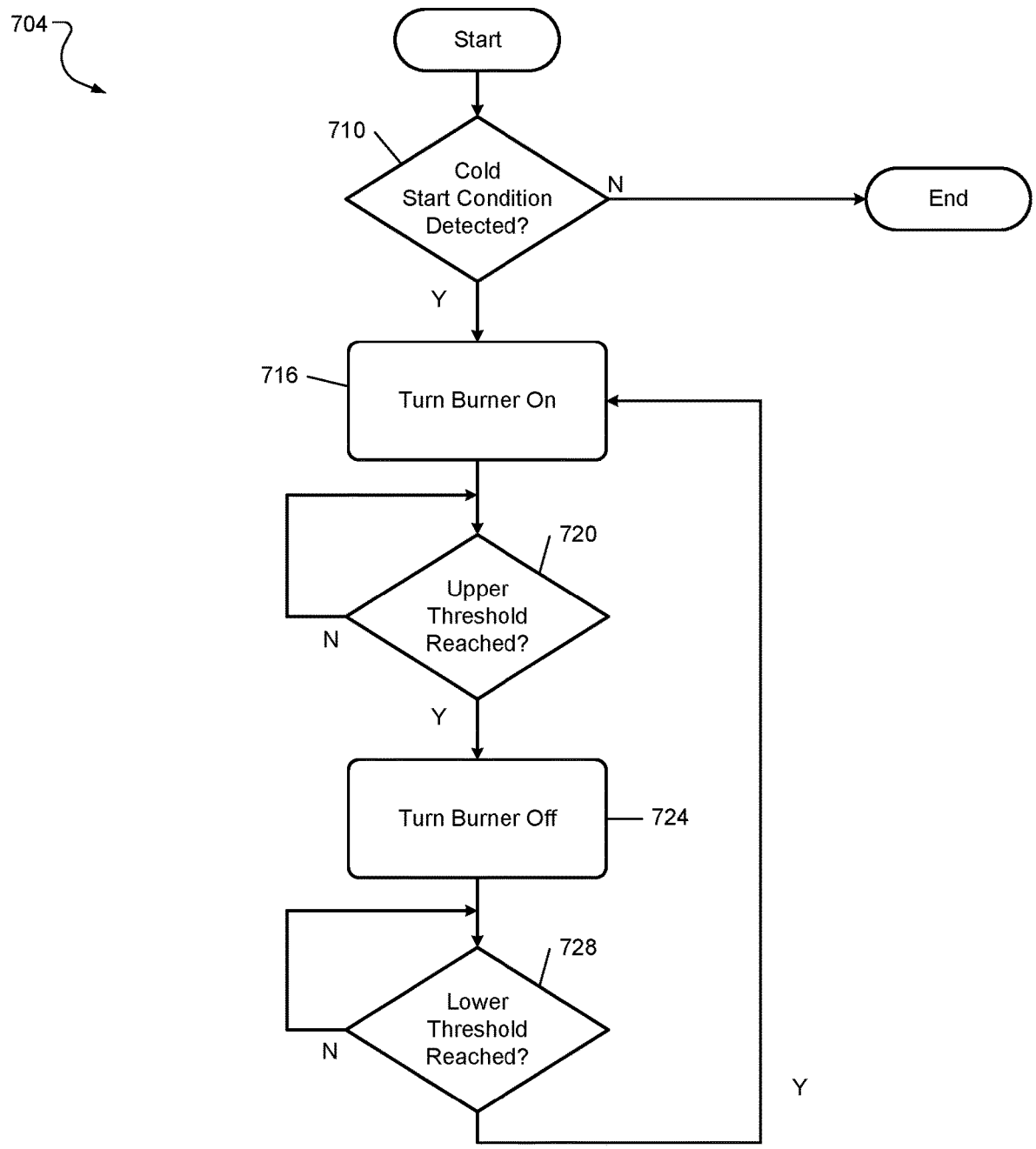
Figure 7C:
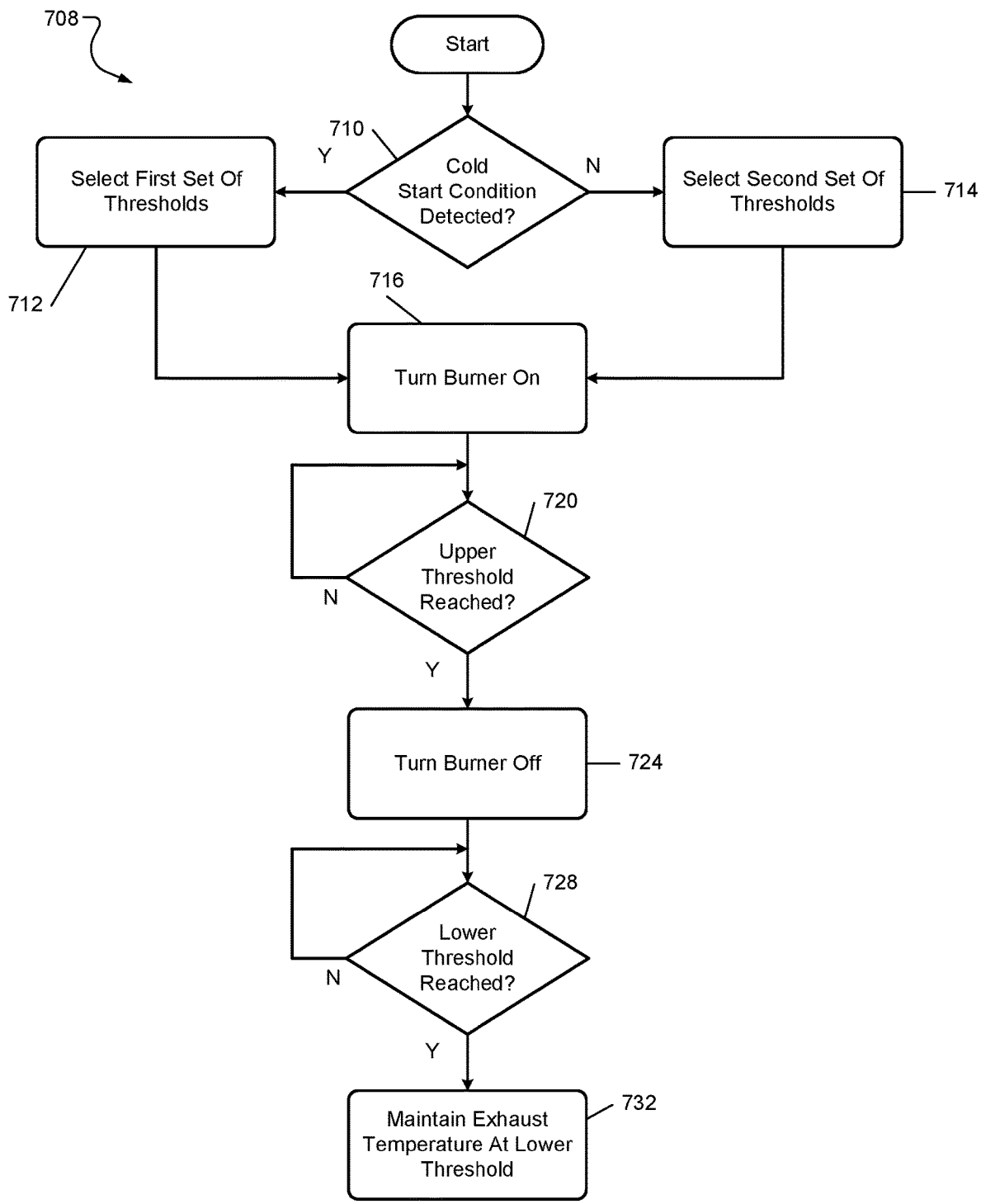

FIGS. 7A, 7B, and 7C are flowcharts depicting example multi-tier threshold control methods 700, 704, and 708, respectively, for an exhaust burner. Each of the methods 700, 704, and 708 may be performed at engine startup and/or prior to engine startup as described above. For example, only, the methods 700, 704, and 708 are performed using the exhaust control module 138 and related components of the exhaust system 120.

Referring to FIG. 7A, the method 700 is configured to operate the burner 154 until an upper threshold is reached and then maintain a temperature at or around a lower threshold. At 710, the method 700 optionally determines whether a cold start condition is detected. For example, the method 700 determines whether engine coolant temperature is below a threshold, the engine has been off for a predetermined period, etc. If true, the method 700 continues to 716. If false, the method 700 ends and the engine may be started in accordance with normal operating parameters (e.g., without operating the burner 154). In some examples, the method 700 may be performed regardless of whether cold start conditions are detected.

At 716, the method 700 (e.g., the exhaust control module 138) turns the burner 154 on. In some examples, the method 700 may increase engine idle speed upon turning the burner 154 on to increase exhaust flow. At 720, the method 700 determines whether a temperature of the exhaust measured downstream of the DPF 126 (e.g., using the sensor 178 positioned at the outlet of the DPF 126) has reached the upper threshold. If true, the method 700 continues to 724. If false, the method 700 continues to monitor the temperature measured by the sensor 178 to determine whether the measured temperature reaches the upper threshold.

At 724, the burner is turned off. At 728, the method 700 determines whether the measured temperature has reached the lower threshold. If true, the method 700 continues to 732. If false, the method 700 continues to monitor the temperature measured by the sensor 178 to determine whether the measured temperature reaches the lower threshold.

At 732, the method 700 maintains the exhaust temperature at the lower threshold. For example, the method 700 may turn the burner on when the measured temperature reaches the lower threshold or an offset amount below the lower threshold and turn the burner off when the measured temperature reaches the lower threshold or an offset amount above the lower threshold. The method 700 may continue to selectively turn the burner on and off during operation of the engine to maintain the exhaust temperature at the lower threshold (e.g., to compensate for sustained low load operation).

Referring to FIG. 7B, the method 704 is configured to turn the burner 154 off until the upper threshold is reached turn the burner 154 on when the lower threshold is reached to cycle between the upper and lower thresholds. Accordingly, the method 704 is performed in a manner similar to the method 700 until 728. At 728, the method 704 determines whether the measured temperature has reached the lower threshold. If true, the method 704 continues to 716 to turn the burner 154 on. If false, the method 704 continues to monitor the temperature measured by the sensor 178 to determine whether the measured temperature reaches the lower threshold.

Referring to FIG. 7C, the method 708 is configured to operate the burner 154 using different sets of upper and lower thresholds. For example, at 710, the method 708 determines whether a cold start condition is detected. If true, the method 708 continues to 712 and selects a first set of thresholds (e.g., 200 and 300° C.). If false, the method 708 continues to 714 and selects a second set of thresholds (e.g., 200 and 225° C.). The method 708 may then performed in a manner similar to either one of the method 700 and the method 704.

In another example using different sets of thresholds, the burner 154 may be initially operated until the measured temperature reaches a first upper threshold (e.g., 300° C. or greater) and then turned off until the measured temperature reaches the lower threshold. However, instead of turning the burner 154 off to maintain the measured temperature at the lower threshold or to increase the measured temperature to the first upper threshold, a second upper threshold less than the first upper threshold may be selected (e.g., a second upper threshold of 225 or 250° C.). For example, an exhaust temperature measured upstream of the burner 154 may indicate that the exhaust temperature is sufficient to warm the SCR catalyst 124 without requiring additional heating by the burner 154 up to the first upper threshold. In this situation, the burner 154 may instead be operated only until the second upper threshold is reached and is then turned off.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An exhaust control system for a vehicle, the exhaust control system comprising:
   a temperature sensor positioned downstream of an exhaust burner and upstream of a selective catalytic reduction (SCR) catalyst in an exhaust system of the vehicle, wherein the temperature sensor is configured to generate a measurement signal indicative a temperature of exhaust flowing through the exhaust system at an outlet of a diesel particulate filter (DPF) positioned downstream of the exhaust burner; and
   an exhaust control module configured to
   detect a cold start condition and turn the exhaust burner on to heat the exhaust in response to detecting the cold start condition, wherein turning the exhaust burner on includes combusting air and fuel in a combustion chamber of the exhaust burner,
   monitor the temperature of the exhaust based on the measurement signal,
   subsequent to turning the exhaust burner on, turn the exhaust burner off based on a first upper threshold temperature of the exhaust being reached, and
   subsequent to turning the exhaust burner off, monitor the decreasing exhaust temperature and turn the exhaust burner on based on a first lower threshold temperature of the exhaust being reached, wherein the first lower threshold temperature is less than the first upper threshold temperature, the exhaust control module being configured to detect a sustained low-load condition subsequent to the cold start condition and operate the exhaust burner based on a second upper threshold temperature and a second lower threshold temperature in response to the sustained low-load condition being detected, the second upper threshold temperature being less than the first upper threshold temperature.

2. The exhaust control system of claim 1, wherein the temperature sensor is positioned at an outlet of the DPF.

3. The exhaust control system of claim 1, wherein the exhaust control module is configured to turn the exhaust burner on prior to engine startup.

4. The exhaust control system of claim 1, wherein the exhaust control module is configured to maintain the exhaust at one of the first lower threshold temperature and the second lower threshold temperature.

5. The exhaust control system of claim 1, wherein the first upper threshold temperature is greater than or equal to 300° C.

6. The exhaust control system of claim 1, wherein the sustained low-load condition is a low load operation that continues for longer than a first predetermined period, in response to the exhaust burner being turned on a predetermined number of times within a second predetermined period.

7. The exhaust control system of claim 1, wherein the exhaust control module is configured to increase an engine idle speed upon turning the exhaust burner on.

8. The exhaust control system of claim 1, wherein the second upper threshold temperature is greater than the first lower threshold temperature.

9. The exhaust control system of claim 1, further comprising:
   an air pump configured to pump air into the combustion chamber of the exhaust burner;
   a spark plug configured to ignite an air/fuel mixture within the combustion chamber of the exhaust burner;
   a fuel control module configured to, while an engine of the vehicle is off prior to engine startup, selectively actuate a fuel injector and begin fuel injection;
   a pump control module configured to, while the engine is off prior to the engine startup, selectively turn on the air pump; and
   a spark control module configured to, while the engine is off and prior to the engine startup, selectively apply power to the spark plug and begin providing spark.

10. The exhaust control system of claim 1, further comprising:
    a diesel emissions fluid (DEF) injector configured to inject a DEF into the exhaust system upstream of the SCR catalyst; and
    a DEF control module configured to, while an engine of the vehicle is off prior to engine startup, selectively actuate the DEF injector and begin DEF injection.

11. The exhaust control system of claim 1, wherein turning the exhaust burner on to heat the exhaust, turning the exhaust burner off, and turning the exhaust burner on subsequent to turning the exhaust burner off occur prior to engine startup.

12. A method of operating an exhaust control system of a vehicle, the method comprising:
    receiving a measurement signal from a temperature sensor positioned downstream of an exhaust burner and upstream of a selective catalytic reduction (SCR) catalyst in an exhaust system of the vehicle, wherein the measurement signal is indicative a temperature of exhaust flowing through the exhaust system at an outlet of a diesel particulate filter (DPF) positioned downstream of the exhaust burner;
    turning the exhaust burner on to heat the exhaust, wherein turning the exhaust burner on includes combusting air and fuel in a combustion chamber of the exhaust burner;

monitoring the temperature of the exhaust based on the measurement signal;

subsequent to turning the exhaust burner on, turning the exhaust burner off based on a first upper threshold temperature of the exhaust being reached;

subsequent to turning the exhaust burner off, monitoring the decreasing temperature and turning the exhaust burner on based on a first lower threshold temperature of the exhaust being reached, wherein the first lower threshold temperature is less than the first upper threshold temperature;

detecting a cold start condition;

operating the exhaust burner based on a first set of thresholds including the first upper threshold temperature and the first lower threshold temperature in response to detecting the cold start condition;

detecting a sustained low-load condition subsequent to the cold start condition; and operating the exhaust burner based on a second set of thresholds including a second upper threshold temperature and a second lower threshold temperature in response to the sustained low-load condition being detected, wherein the second upper threshold temperature is less than the first upper threshold temperature.

13. The method of claim 12, wherein the temperature sensor is positioned at an outlet of the DPF.

14. The method of claim 12, wherein at least one of turning the exhaust burner on, turning the exhaust burner off, and turning the exhaust burner on subsequent to turning the exhaust burner off occur prior to engine startup.

15. The method of claim 12, further comprising, subsequent to turning the exhaust burner on based on the lower threshold temperature, turning the exhaust burner off based on the upper threshold temperature.

16. The method of claim 12, further comprising turning the exhaust burner on prior to engine startup in response to detecting the cold start condition.

17. The method of claim 12, further comprising increasing an engine idle speed upon turning the exhaust burner on.

\* \* \* \* \*